United States Patent
Coad et al.

(10) Patent No.: US 11,326,994 B2
(45) Date of Patent: May 10, 2022

(54) PARALLEL SAMPLE STRESS RUPTURE TEST IN A CONTROLLED ENVIRONMENT

(71) Applicant: THE BOEING COMPANY, Chicago, IL (US)

(72) Inventors: Dennis L. Coad, Madison, AL (US); Alan Buitekant, Huntsville, AL (US); Douglas E. Bailey, Friendswood, TX (US); James E. Russell, Madison, AL (US); Patrick D. McAllister, Madison, AL (US); Thomas M. Collins, Decatur, AL (US); Victor L. Alonso, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 189 days.

(21) Appl. No.: 16/739,243

(22) Filed: Jan. 10, 2020

(65) Prior Publication Data
US 2021/0215588 A1 Jul. 15, 2021

(51) Int. Cl.
*G01N 3/14* (2006.01)
*G01N 3/06* (2006.01)

(52) U.S. Cl.
CPC ............. *G01N 3/14* (2013.01); *G01N 3/06* (2013.01)

(58) Field of Classification Search
CPC .. G01N 3/08; G01N 3/14; G01N 3/30; G01N 3/303
See application file for complete search history.

(56) References Cited

U.S. PATENT DOCUMENTS

| 2,459,738 | A | * | 1/1949 | Prettyman | G01N 3/14 374/50 |
| 3,808,880 | A | * | 5/1974 | Berman | G01N 3/14 73/805 |
| 7,938,015 | B2 | * | 5/2011 | Kaneda | G01N 3/02 73/788 |
| 8,573,064 | B2 | * | 11/2013 | Zhao | G01N 3/38 73/856 |

FOREIGN PATENT DOCUMENTS

JP 07257855 A * 10/1995

* cited by examiner

*Primary Examiner* — Erika J Villaluna
(74) *Attorney, Agent, or Firm* — Patterson + Sheridan, LLP (57) ABSTRACT

The present disclosure provides for parallel sample stress rupture test in a controlled environment by loading predefined amounts of weight on stack lines; positioning the stack lines on a tensioning platform in alignment with respective upper clamps when the tensioning platform is a first distance away from the upper clamps; clamping samples to a corresponding lower clamp and upper clamp pair; and moving the tensioning platform to a second distance away from the upper clamps that is greater than the first distance such that the stack lines are suspended above the tensioning platform to apply individual tensions to the individual samples based on the predefined amount of weight loaded onto the individual stack lines.

20 Claims, 8 Drawing Sheets

PARALLEL SAMPLE STRESS RUPTURE TEST IN A CONTROLLED ENVIRONMENT

FIELD

Aspects of the present disclosure relate to systems and methods for performing stress tests on materials.

BACKGROUND

Various material properties can only be determined reliably after lengthy testing. Such tests may take days, months, or years, which requires great consistency in the test environment and test apparatus over that length of time to yield reliable measurements. Ensuring consistency can be particularly complicated when destructive tests are required, as the completion of one lifetime analysis can affect an ongoing lifetime analysis of another sample and small variations in test conditions across several samples can negatively affect the accuracy of the associated lifetime analyses.

SUMMARY

The present disclosure provides a device in one aspect, the device including: a frame; a first upper clamp and a second upper clamp hanging from the frame; a first stack line, including: a first lower clamp aligned with the first upper clamp; and a first weight platform configured to carry a first user-defined amount of weight; a second stack line, including: a second lower clamp aligned with the second upper clamp; and a second weight platform configured to carry a second user-defined amount of weight; and a tensioning platform configured to uniformly move the first weight platform and the second weight platform between: a first distance relative to the first upper clamp and the second upper clamp; and a second distance, greater than the first distance, relative to the first upper clamp and the second upper clamp.

In one aspect, in combination with any example device above or below, the device further includes: a separator connected to the frame between at least a portion of the first weight platform and a portion of the second weight platform.

In one aspect, in combination with any example device above or below, the device further includes: a pad disposed between the tensioning platform and the first stack line, the pad further comprising: a cushioning layer configured to mitigate a force of impact from the first stack line on the tensioning platform; and a non-stick layer disposed between the cushioning layer and the first stack line configured to prevent the first stack line from adhering to the cushioning layer.

In one aspect, in combination with any example device above or below, the first weight platform and the second weight platform are each configurable to carry a variable amount of weight.

In one aspect, in combination with any example device above or below, the first stack line and the second stack line are of a uniform height.

In one aspect, in combination with any example device above or below, the device further includes: a chamber in which the frame is located that is configured to maintain a predefined atmosphere and maintain a predefined temperature.

In one aspect, in combination with any example device above or below, the first upper clamp and the first lower clamp are configured to hold a first sample under a first tension applied via the first weight platform when the tensioning platform is positioned at the second distance; and the second upper clamp and the second lower clamp are configured to hold a second sample under a second tension applied via the second weight platform when the tensioning platform is positioned at the second distance.

In one aspect, in combination with any example device above or below, the first upper clamp is held from a first rail of the frame at a first height relative to the tensioning platform; the second upper clamp is held from a second rail of the frame at a second height, less than the first height, relative to the tensioning platform; the first stack line is a first length; and the second stack line is a second length less than the first length.

The present disclosure provides a system in one aspect, the system including: a first sample held at a first upper end by a first upper clamp and held at a first lower end by a first lower clamp; a second sample held at a second upper end by a second upper clamp and held at a second lower end by a second lower clamp; a first stack line connected to the first lower clamp and to a first predefined amount of weight; a second stack line connected to the second lower clamp and to a second predefined amount of weight; and a tensioning platform configured to move between: a first position at which a first tension based on the first predefined amount of weight is applied to the first sample via the first stack line and a second tension based on the second predefined amount of weight is applied via the second stack line to the second sample; and a second position at which the first tension is removed from the first sample and the second tension is removed from the second sample.

In one aspect, in combination with any example system above or below, the tensioning platform is configured remove slack from the first sample and the second sample at a uniform rate when moved from the second position to the first position.

In one aspect, in combination with any example system above or below, the tensioning platform further comprises: a pad disposed between the tensioning platform and the first stack line, the pad having a non-stick layer configured to prevent the first stack line from adhering to the pad.

In one aspect, in combination with any example system above or below, the tensioning platform includes a selectively removable lever, the lever being configured to provide a mechanical advantage in moving the tensioning platform between the first position and the second position.

In one aspect, in combination with any example system above or below, the first upper clamp, the second upper clamp, and the tensioning platform are mounted in a frame.

In one aspect, in combination with any example system above or below, the system further includes: a separator disposed between the first stack line and the second stack line.

In one aspect, in combination with any example system above or below, the first predefined amount of weight is different from the second predefined amount of weight.

In one aspect, in combination with any example system above or below, the system further includes: a chamber containing a controlled atmosphere at a controlled temperature in which the first sample and the second sample are located.

The present disclosure provides a method in one aspect, the method including: loading a first predefined amount of weight on a first stack line; loading a second predefined amount of weight on a second stack line; positioning the first stack line and the second stack line on a tensioning platform in alignment with a first upper clamp and a second upper clamp respectively when the tensioning platform is a first distance away from the first upper clamp and the second upper clamp; clamping a first sample to a first lower clamp of the first stack line and the first upper clamp; clamping a second sample to a second lower clamp of the second stack line and the second upper clamp; and moving the tensioning platform to a second distance away from the first upper clamp and the second upper clamp that is greater than the first distance such that the first stack line and the second stack line are suspended above the tensioning platform to apply a first tension to the first sample based on the first predefined amount of weight and a second tension to the second sample based on the second predefined amount of weight.

In one aspect, in combination with any example method above or below, the method further includes: in response to one of the first sample and the second sample breaking, generating an alert.

In one aspect, in combination with any example method above or below, the method further includes: in response to one of the first sample and the second sample breaking, dissipating a force of impact to a non-broken sample via a pad disposed on the tensioning platform.

In one aspect, in combination with any example method above or below, the method further includes: maintaining the first sample and the second sample at a predefined atmosphere and temperature for a predefined amount of time while the tensioning platform is located the second distance away from the first upper clamp and the second upper clamp.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure provides for a consistent test environment for measuring stress rupture points (e.g., a Weibull scale and shape parameters) for materials, such as composite strands, under various test conditions. In one aspect, a test frame holds a plurality of samples under constant tension until a sample breaks, ruptures, stretches beyond a threshold limit, or otherwise experiences a defined material failure. The test frame isolates the samples from one another while holding the samples under the same set of atmospheric and temperature characteristics (which may include the same or different tensions). The test frame may include a tensioning platform configured to allow an operator to set up several samples to be tested in parallel and to move the samples from a setup to a testing position uniformly and smoothly, thus starting each of the samples at the same time and mitigating jerk on the samples when beginning test. In various aspects, to mitigate the effects of one sample failing on another sample, various cushions, springs, dampers, and/or separators isolate the samples from one another during test.

Figure 1:
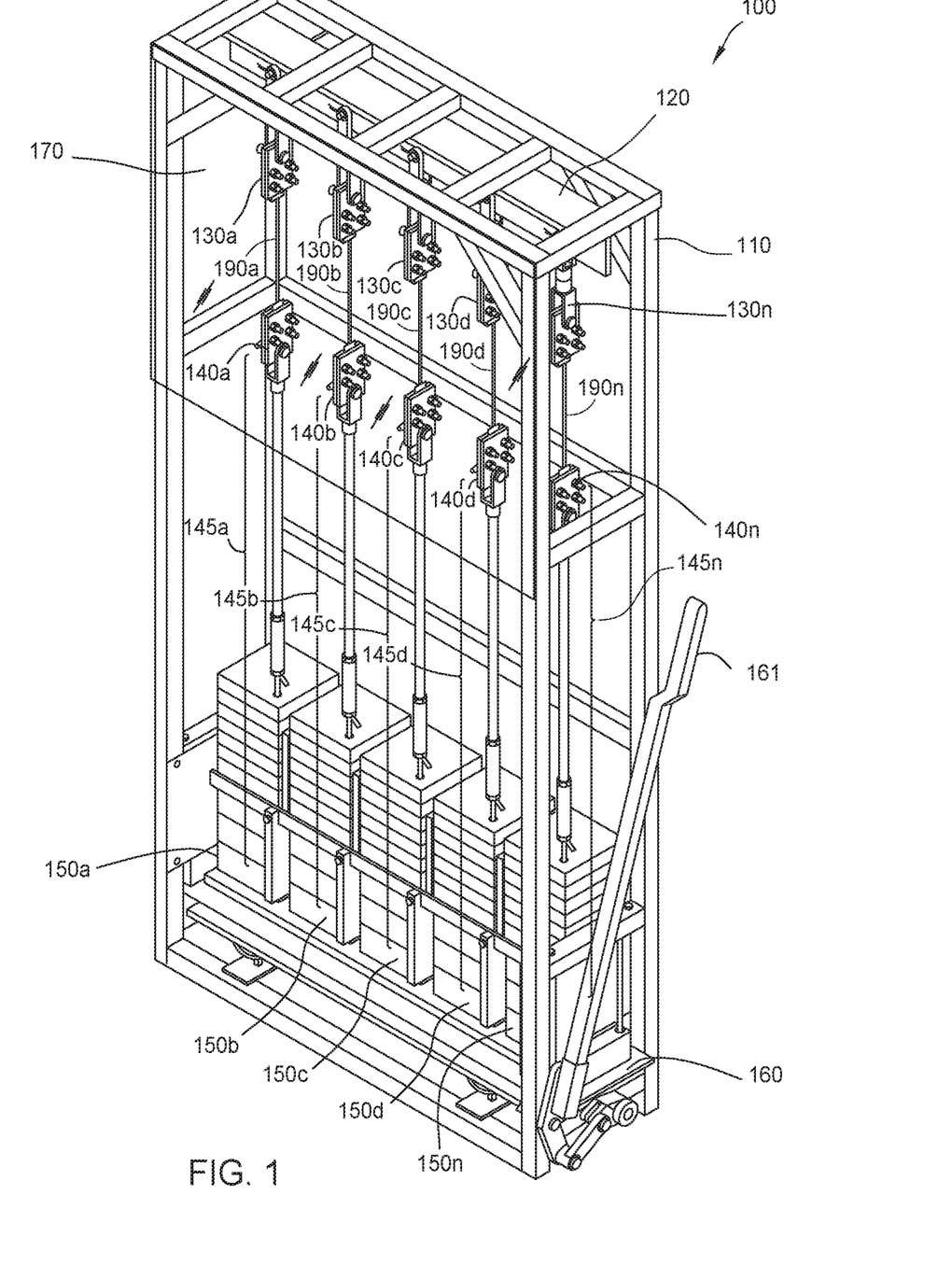
FIG. 1 illustrates an example test stand, according to aspects of the present disclosure.

FIG. 1 illustrates an example test stand 100, according to aspects of the present disclosure. The test stand 100 may be disposed with one or more other test stands 100 in a test chamber (not illustrated) to perform long-term destructive test on several samples 190 in parallel in a controlled environment. In various aspects, the test chamber includes an airtight or fluid-tight closed container in which the test stand 100 is secured as well as temperature, pressure, and fluid composition control mechanisms (e.g., heaters, coolers, humidifiers, dehumidifiers, pressurizers, fluid reservoirs, etc.). In various aspects, the fluid held and maintained in the test chamber can be air (e.g., at a predefined humidity level) a known gas composition (e.g., nitrogen, oxygen, argon, carbon dioxide, and mixtures thereof), or a known liquid composition (e.g., water, alcohol, fuel, oxidizers, cryogenics, refrigerants, and mixtures thereof) that is maintained within a predefined temperature and pressure range. Additionally or alternatively, the test chamber can hold and maintain vacuum.

The test stand 100 includes a frame 110 that supports one or more rails 120 (also referred to as crossbars) that support, in turn, one or more upper clamps 130a-n (generally referred to as upper clamps 130). Each upper clamp 130a-n can be paired with a corresponding lower clamp 140a-n (generally, lower clamps 140) to hold a corresponding sample 190a-n (generally, samples 190) during testing. The lower clamps 140a-n are each paired with a corresponding weight platform 150a-n (generally, weight platforms 150) that is user-configurable to carry a user-defined amount of weight for testing the corresponding sample 190a-n. A corresponding lower clamp 140 and weight platform 150 can collectively be referred to as a stack line 145 (individually, stack lines 145a-n).

A tensioning platform 160 moves up and down—between at least first and second positions that are different distances away from the rail 120. Accordingly, all stack lines 145 resting on the tensioning platform 160 are moved up and down according to the motion of the tensioning platform 160. When a sample 190 is held between an upper clamp 130 and a lower clamp 140, the sample 190 will be slack (i.e., not held under tension) in the first position and the sample 190 will be held under tension when the tensioning platform 160 is in the second position. Stated differently, a non-broken sample 190 suspends the weight platform 150 above the tensioning platform 160.

In various aspects, a selectively removable lever 161 is connected to the tensioning platform 160 to provide a mechanical advantage to an operator in moving the tensioning platform 160 (and the weight of any stack lines 145 resting on the tensioning platform 160) between the first and second positions. The lever 161 is connected to a lift mechanism, which can include a hydraulic lift or jack, a ratcheting mechanism, or a mechanical locking mechanism to hold the tensioning platform 160 in one of at least two desired positions and to provide a smooth action when moving between the desired positions. Other positions beyond the two described positions may also be possible, such as, for example, to accommodate different lengths of samples 190 being held slack/tensioned, different lengths of the stack lines 145, etc. Stated differently, the tensioning platform 160 holds the stack lines 145 at a uniform height relative to one another and moves the stack lines 145 at a uniform rate to one another to various user-defined heights to provide or remove tension from the samples 190.

In some aspects, an enclosure 170 may be defined fully or partially around the frame 110. For example, a sheet of safety glass may be installed on a front face of the test stand 100 as a partial enclosure 170 to capture potential debris from the failure of the sample 190 during test. In another example, the enclosure 170 may be defined around all of the faces of the test stand 100 to contain a specified atmosphere different from that of the test chamber in which the test stand 100 is held (e.g., as a fluid-tight sub-chamber). The enclosure 170 may run the full height of the test stand 100, or may be confined to a portion of the test stand 100 (e.g., overlapping the region of the test stand 100 where the samples 190 are held).

The samples 190 may include various materials of various thicknesses, lengths, and cross-sectional areas that are to be held under tension by the test stand 100. During a test, the samples 190 are held by the upper clamp 130 and the lower clamp 140 on opposite ends (e.g., an upper end and a lower end, respectively), and are subjected to a tensile force based on the amount of weight included on the weight platform 150. The samples 190 suspend the weight platforms 150 above the tensioning platform 160 (which has been moved to remove slack from the samples 190) until a material failure occurs in the sample 190 that ends the test and removes the downward force from the weight platform 150 on the sample 190 (e.g., the sample 190 ruptures into multiple pieces, dropping the weight platform 150; the sample 190 frays or breaks, and an operator halts the test; the sample 190 deforms (e.g., stretches), lowering the weight platform 150; etc.).

In some aspects, the samples 190 include a bundle of fibers, wires, or strands of a material, which may be braided, coiled, wound, twined, sheathed, or otherwise held together in a combined strand or rope. In other aspects, the samples 190 include a single fiber, wire, or strand of the material under test. Additionally, the ends of a sample 190 can be captured in a cap or aglet to prevent the sample 190 from fraying or unwinding at the ends and/or to reconfigure the cross-sectional shape of the sample 190 for easier capture by the upper clamps 130 and lower clamps 140.

In some aspects, the upper clamps 130 and lower clamps 140 include two plates 180 (which may be flat or shaped according to a cross-sectional shape of the samples 190) that are held together with the sample 190 therebetween via a set of bolts applying pressure to the plates 180. Additionally or alternatively, a torsion spring, vice, or expansion screw may be used to pinch or otherwise capture the sample 190 between the plates 180 of the upper clamps 130 and lower clamps 140. In some aspects, the upper clamps 130 and lower clamps 140 include one or more swivel joints to rotate along a number of corresponding axes or may include a ball point to rotate in multiple axes. In other aspects, the upper clamps 130 and/or lower clamps 140 are held rigidly in place and do not rotate about any axis.

The amount of tension placed on the samples 190 is based on the amount of weight included in the stack lines 145, which may be set using a percentage of the ultimate strength of the material(s) of the samples 190 and the cross-sectional area of the samples 190. During a test, each sample 190 may be placed under the same amount of tension (e.g., using the same amount of predefined weight per cross-sectional area) or under different amounts of tension (e.g., using different predefined amounts of weight and/or different cross-sectional areas), but when loaded on a shared test stand 100, each sample 190 begins test at the same time (i.e., when the tensioning platform 160 is lowered) and is subject to the same environmental conditions in the test chamber (or other environment) in which the test stand 100 is located.

Figure 2A:
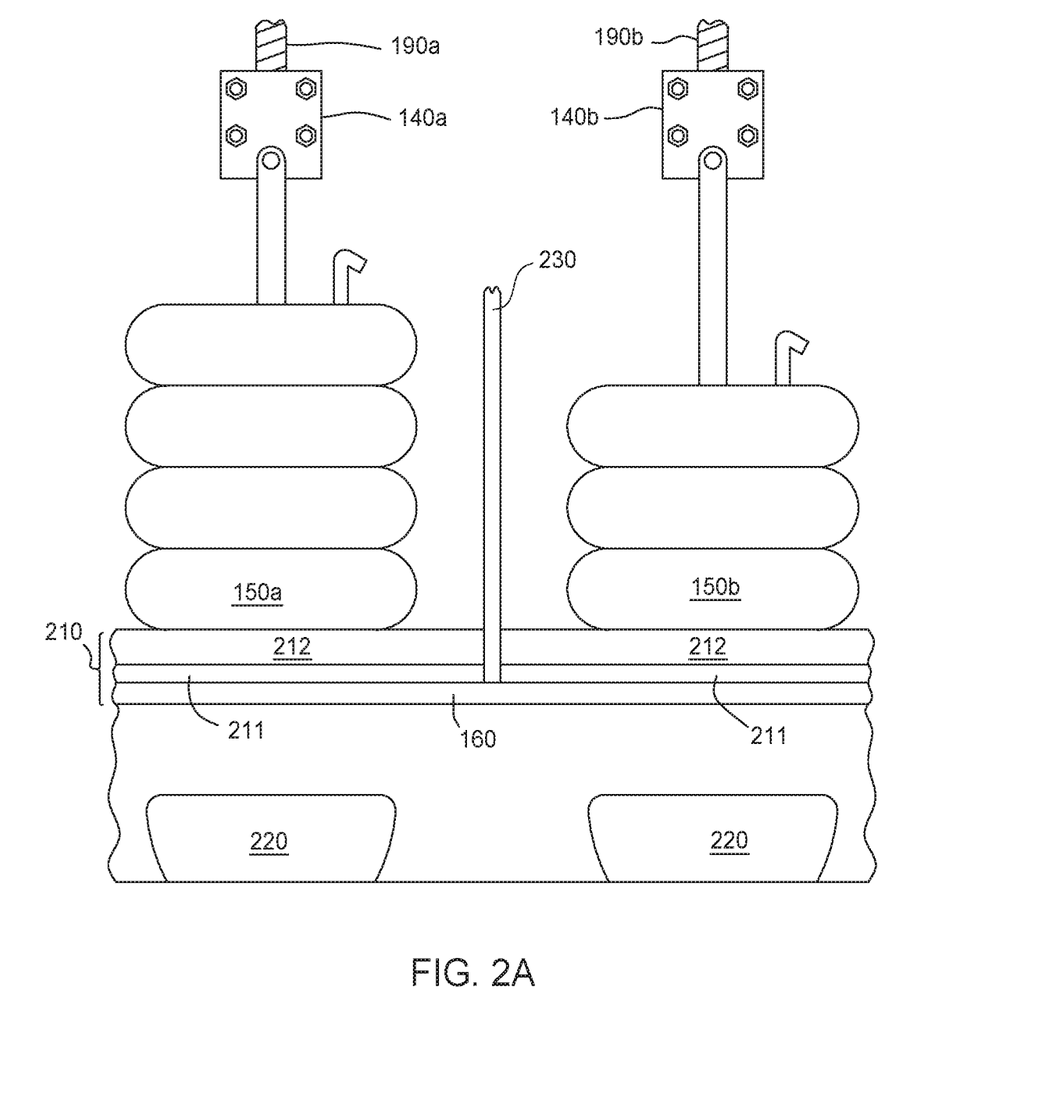
FIGS. 2A-2C illustrate isolated views of the tensioning platform, according to aspects of the present disclosure.
Figure 2B:
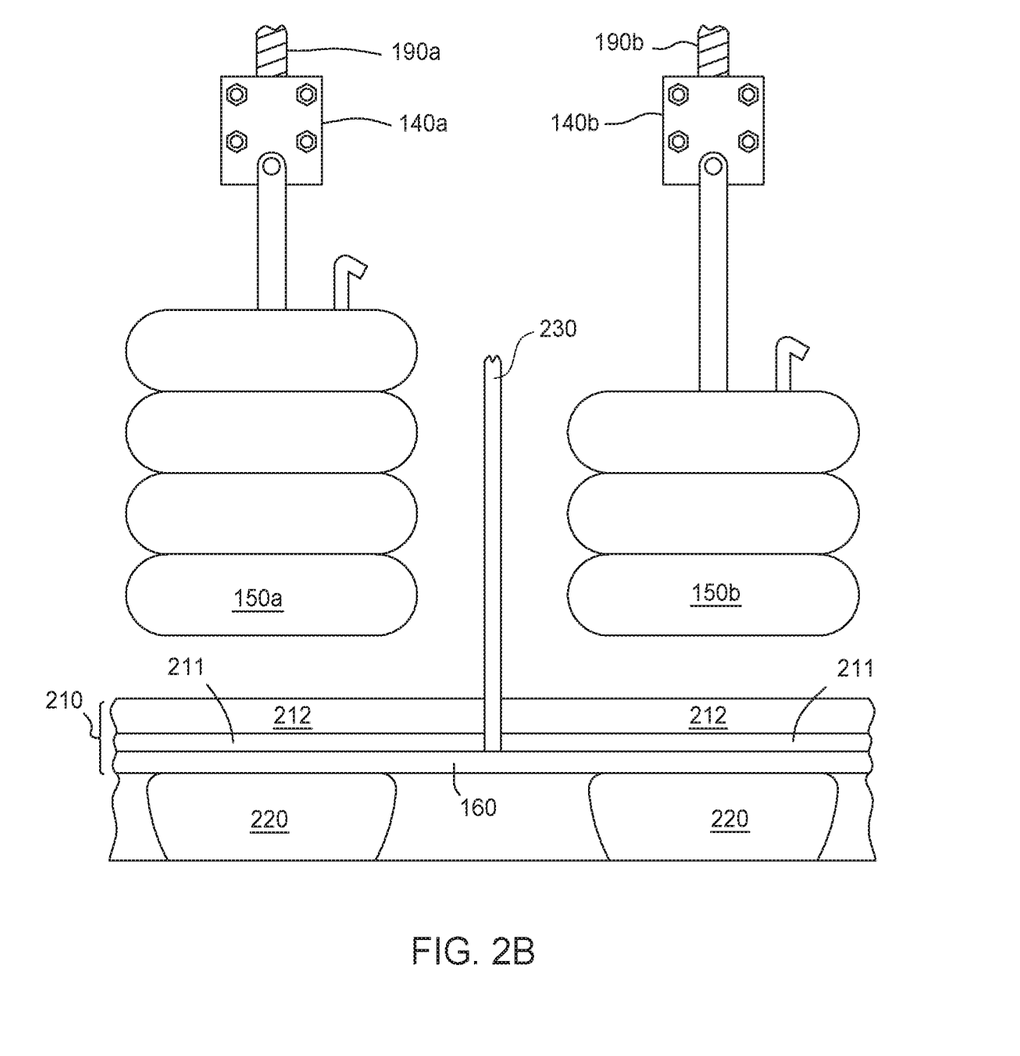
Figure 2C:
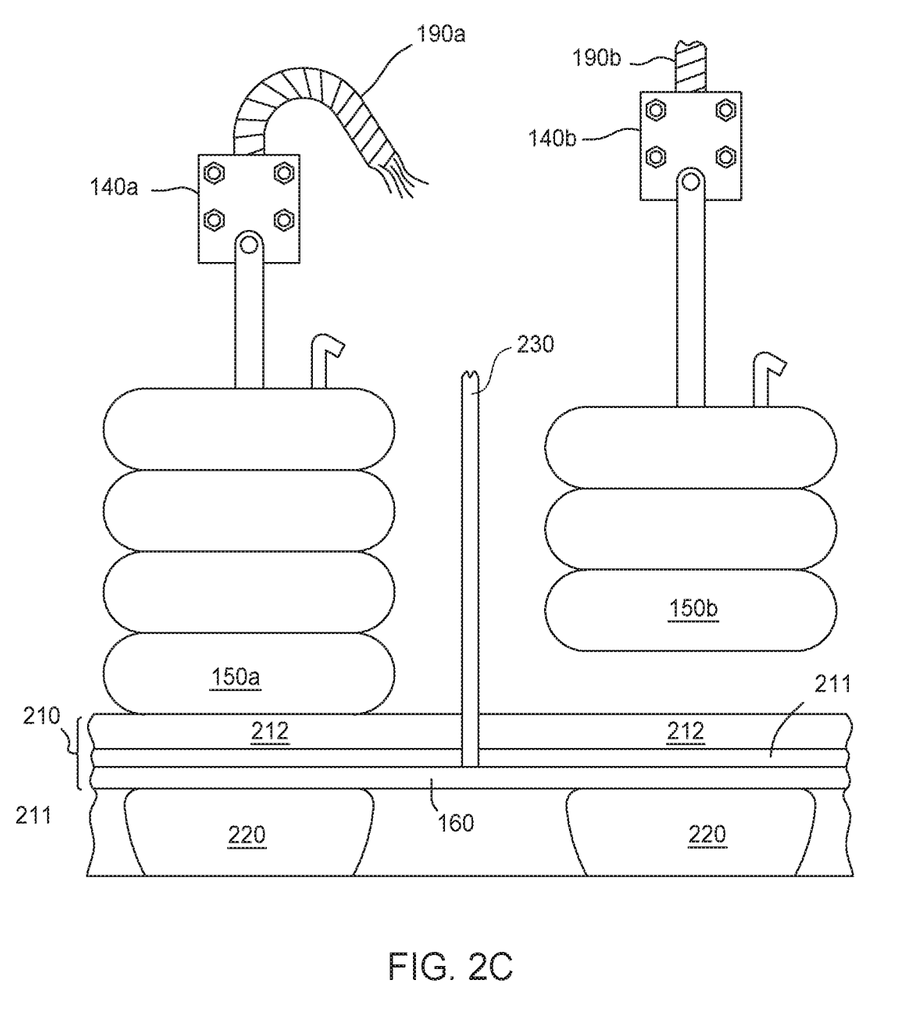

FIGS. 2A and 2B illustrate an isolated view of the tensioning platform 160 in a first position 201 and in a second position 202 respectively. FIG. 2C illustrates an isolated view of the tensioning platform 160 in the second position 202, but with a first weight platform 150a resting on the tensioning platform 160 and a second weight platform 150b suspended above the tensioning platform 160, such as, for example, due to the first sample 190a but not the second sample 190b experiencing a material failure (e.g., the first sample 190a rupturing into at least two parts, breaking and unwinding, being deformed or stretched, etc.).

In the first position 201, illustrated in FIG. 2A, the tensioning platform 160 is located at a first distance above the base of the test stand 100 (e.g., from the ground). The tensioning platform 160 may also be understood to be located a first distance from the upper clamps 130, although as different upper clamps 130 can hang different distances from an associated rail 120 (or from different rails 120), the first "distance" may be understood to be a first "set of distances" in such aspects. In the first position 201, the stack lines 145 can rest on the tensioning platform 160 without tensioning the sample 190 (if installed), thus allowing an operator to load the stack lines 145 into the test stand 100, secure the samples 190 between the associated upper clamps 130 and lower clamps 140, or otherwise perform operations while the samples 190 are not under tension.

In the second position, illustrated in FIGS. 2B and 2C, the tensioning platform is closer to the ground (and further from the upper clamps 130) than in the first position 201. Based on the length of the samples 190, and whether the samples 190 have failed (e.g., stretched, ruptured, broken, etc.), the stack lines 145 can be suspended above the tensioning platform 160 (e.g., as in FIG. 2B) or can return to rest on the tensioning platform 160 (e.g., fall from a suspended position). As will be appreciated, when a sample 190 that suspends a weight over a tensioning platform 160 fails, those weights fall and impact the tensioning platform 160 below.

To mitigate the effects of one sample 190a failing on the other samples 190b-n still undergoing test on a shared test stand 100, the test stand 100 includes various features to absorb and spread the force of impact, minimize the force of impact, and redirect the force of impact and thereby isolate the samples 190 from one another while testing those samples 190 in parallel.

FIGS. 2A-2C illustrate some features of the tensioning platform 160 that help isolate the samples 190 under test from one another so that when one sample 190 fails (e.g., the first sample 190a in FIG. 2C), the effects on the other samples 190 (e.g., the second sample 190b in FIG. 1C) are reduced.

A pad 210 is disposed between an upper surface of the tensioning platform 160 and the bottom surfaces of the weight platforms 150. The pad 210 includes a cushioning layer 211 (e.g., including a rubber, foam, gel, fluid bladder, or other deformable material defining a cushion) and a non-stick layer 212 disposed over the cushioning layer 211. The cushioning layer 211 mitigates a force of impact from a stack lines 145 dropping from a suspended position to a non-suspended position. (e.g., the first stack line 145a between FIG. 2B to 2C) from transferring to the frame 110 or any stack lines 145 still suspended by the respective samples 190. The non-stick layer 212 prevents the stack lines 145 resting on the pad 210 from adhering to the cushioning layer 211; thus allowing a clean release of the weight platforms 150 from the tensioning platform 160 when the tensioning platform 160 moves from the first position 201 (per FIG. 2A) to the second position 202 (per FIG. 2B) and further spreading the force of impact across a greater surface area of the cushioning layer 211.

One or more bumpers 220 can be disposed on or beneath an under the tensioning platform 160. The bumpers can be located on the ground attached to a lower support beam of the frame 110, attached to a lower support beam of the frame 110 raised off of the ground, or can be attached to the under surface of the tensioning platform 160 to help cushion any forces received when a stack line 145 falls onto the tensioning platform 160. The bumpers 220 may include various springs (e.g., leaf, compression, torsion springs, etc.) and compressible materials that cushion and spread the force of impact Additionally, separators 230 can be connected to the tensioning platform 160 and/or the frame 110 between at least a portion of any neighboring stack lines 145 and/or the edge of the test stand 100 to prevent a falling/fallen stack line 145 from contacting the other stack lines 145 in the test stand 100 or in another test stand 100. A separator 230 provides a wall of material that separates one stack line 145 and/or sample 190 from another (or the edge of the test stand 100). A separator 230 may rise from or be connected to the tensioning platform 160, or may be connected to the frame 110 to run across (but not connect to) the tensioning platform 160 between where the stack lines 145 are placed.

Figure 3:
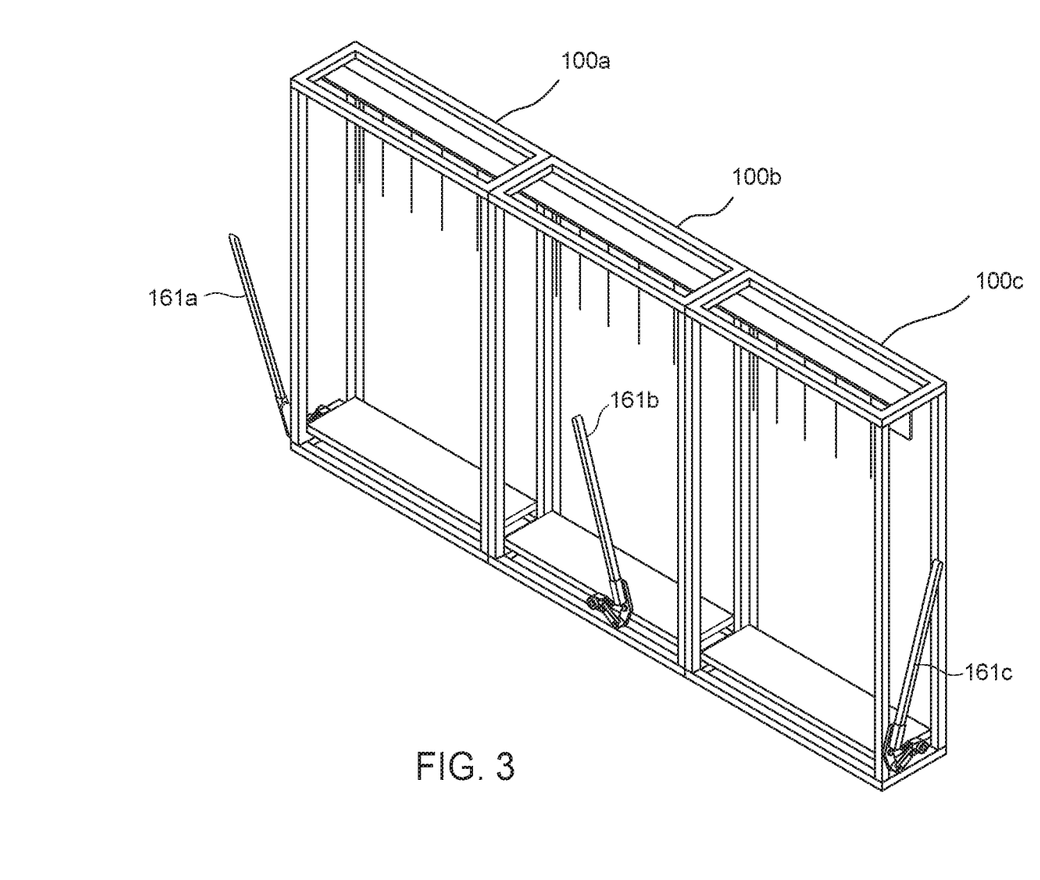
FIG. 3 illustrates three test stands disposed side by side, according to aspects of the present disclosure.

FIG. 3 illustrates three test stands 100a-c disposed side by side, according to aspects of the present disclosure. Several test stands 100 may be collocated in a shared environment in close proximity to one another, and have levers 161a-c for the respective tensioning platforms 160a-c positioned in different locations to aid in fitting more test stands 100 together in the same amount of space.

For example, a leftmost test stand 100a includes a lever 161a mounted on the left side, a central test stand 100b includes a lever 161b mounted on a central face, and a rightmost test stand 100c includes a lever 161c mount on the right side. In some aspects, the associated lifting/lowering mechanism(s) engaged by the lever 161 may include one set of engagements points (e.g., on one of the left side, right side, or central face). In other aspects, the test stand 100 can include several engagement points so that an operator can selectively install a lever 161 on the left, right, or central portions of a single test stand 100. Advantageously, a test stand 100 with multiple engagement points can have several levers 161 installed and used at the same time, thus allowing a crew of operators to work together to raise/lower the tensioning platform 160 with multiple levers 161 (e.g., to lift a load too heavy for one operator).

Figure 4:
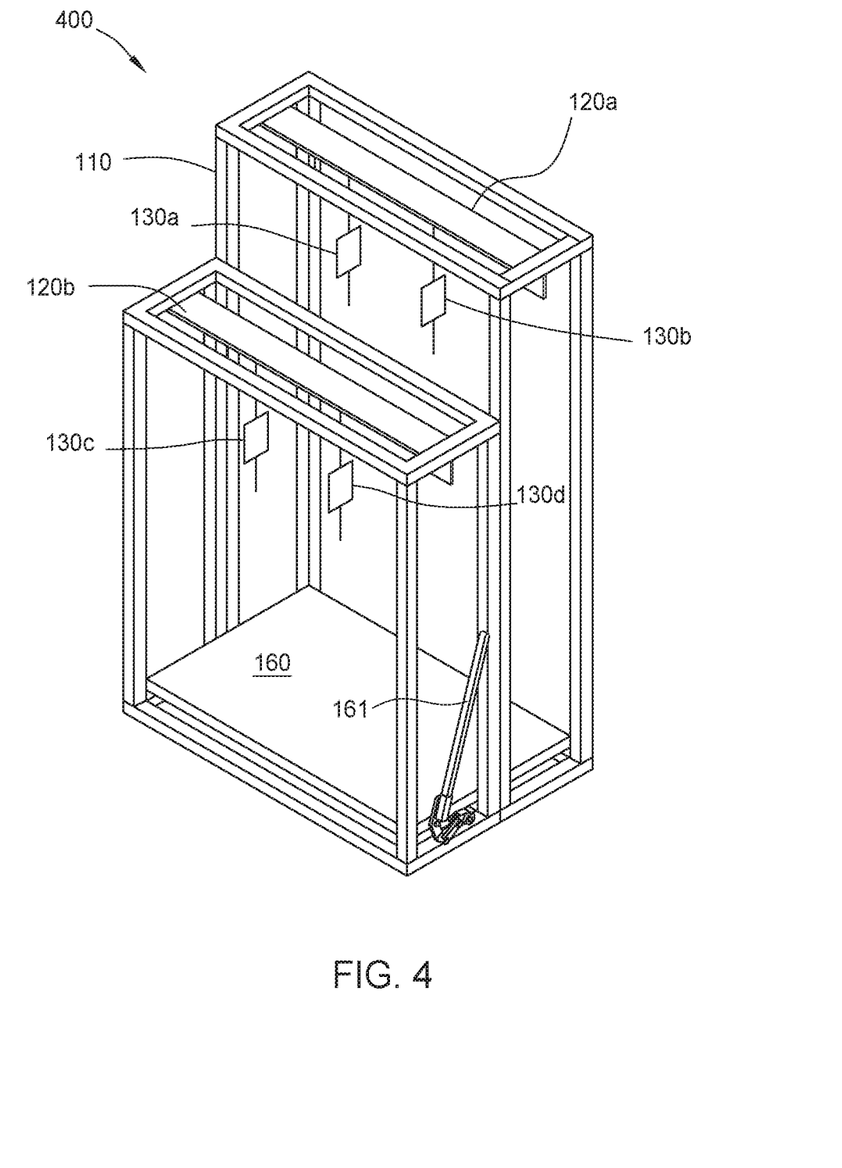
FIG. 4 illustrates a multi-rail test stand, according to aspects of the present disclosure.

FIG. 4 illustrates a multi-rail or tiered test stand 400, according to aspects of the present disclosure. In addition to providing for multiple samples 190 to be tested by suspending the associated upper clamps 130 and stack lines 145 from one rail 120, a tiered test stand 400 can include several tiers of rails 120, such as the first rail 120a and the second rail 120b illustrated in FIG. 4 at different heights relative to a shared tensioning platform 160. Although illustrated at different heights relative to one another in FIG. 4, in other aspects a tiered test stand 400 can include multiple rails 120 at the same height.

In a tiered test stand 400 with different heights between multiple rails 120 and a shared tensioning platform 160, the stack lines 145 may be different heights or the samples 190 may be different lengths so that when the tensioning platform 160 is in a raised position, all of the samples 190 are slack, and when the tensioning platform is in a lowered position, all of the samples 190 (that have not failed) are under tension.

Figure 5:
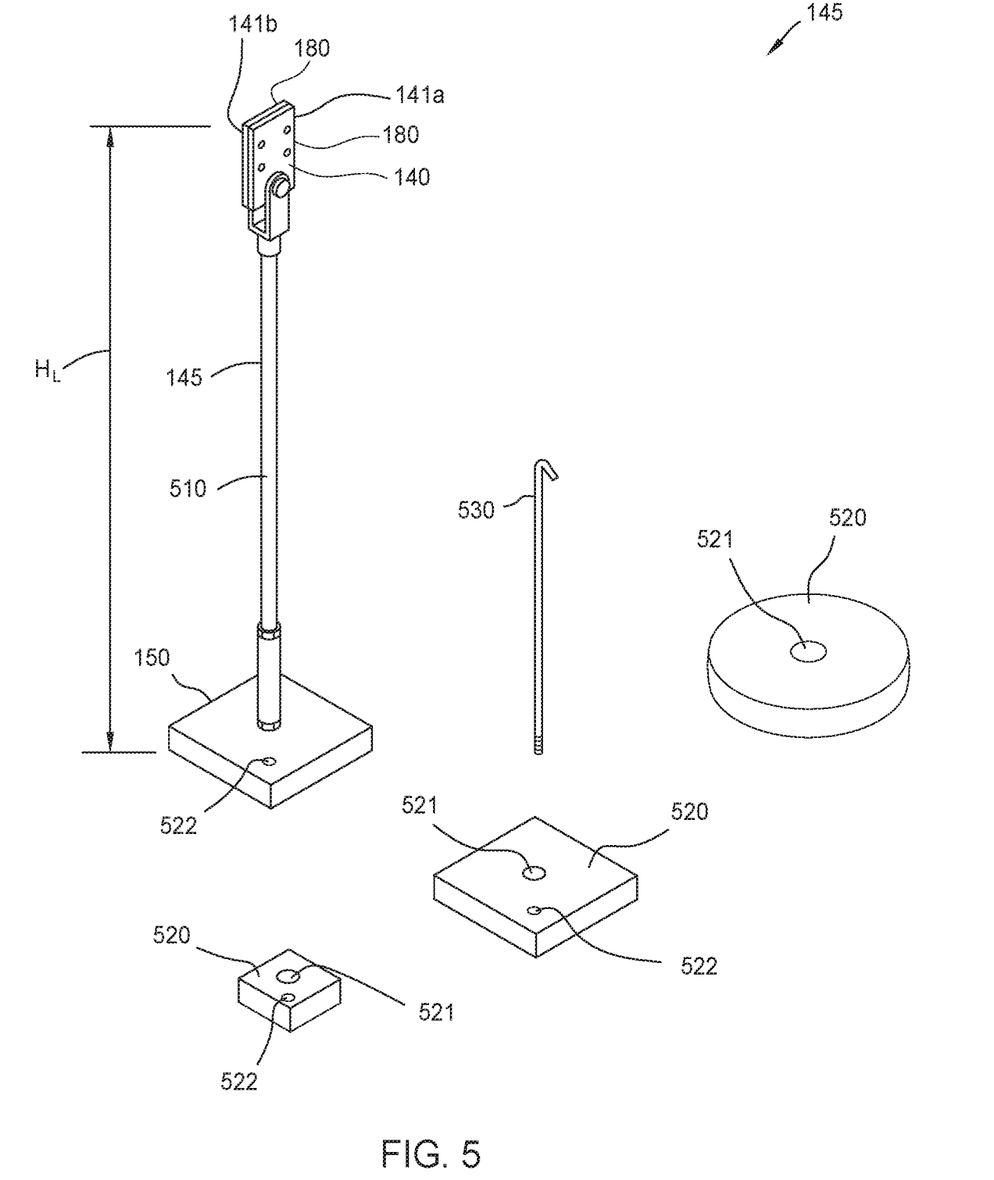
FIG. 5 illustrates components of a stack line, according to aspects of the present disclosure.

FIG. 5 illustrates components of a stack line 145, according to aspects of the present disclosure. The stack line 145 includes a lower clamp 140 on a first end and the weight platform 150 on a second end, opposite the first end. A shaft 510 is centered on the weight platform 150 and extends for a predefined distance ($H_L$) to connect with the lower clamp 140. The shaft 510 can be selectively attachable/detachable with one or more of the weight platform 150 and the lower clamp 140 to allow for different lengths of shafts 510 to be substituted and/or to aid in adding weight blocks 520 to the stack line 145.

In various aspects, the weight blocks 520 have various known masses/weights that an operator can select to provide a desired tension to the sample 190 during test. The weight blocks 520 may be provided with various shapes and include a through-hole 521 at the center of mass for the weight block 520 through which the shaft 510 may be inserted to secure the weight block 520 to the stack line 145. Additionally, the weights block 520 may include an alignment hole 522 through which an alignment rod 530 may be inserted to secure the weights blocks 520 to the stack line 145, and in combination with the shaft 510, prevent the weight blocks 520 from rotating about the shaft 510. The shaft 510 and alignment rod 530 are inserted through the through holes 521 and alignment holes 522, respectively, into the weight platform 150.

Figure 6:
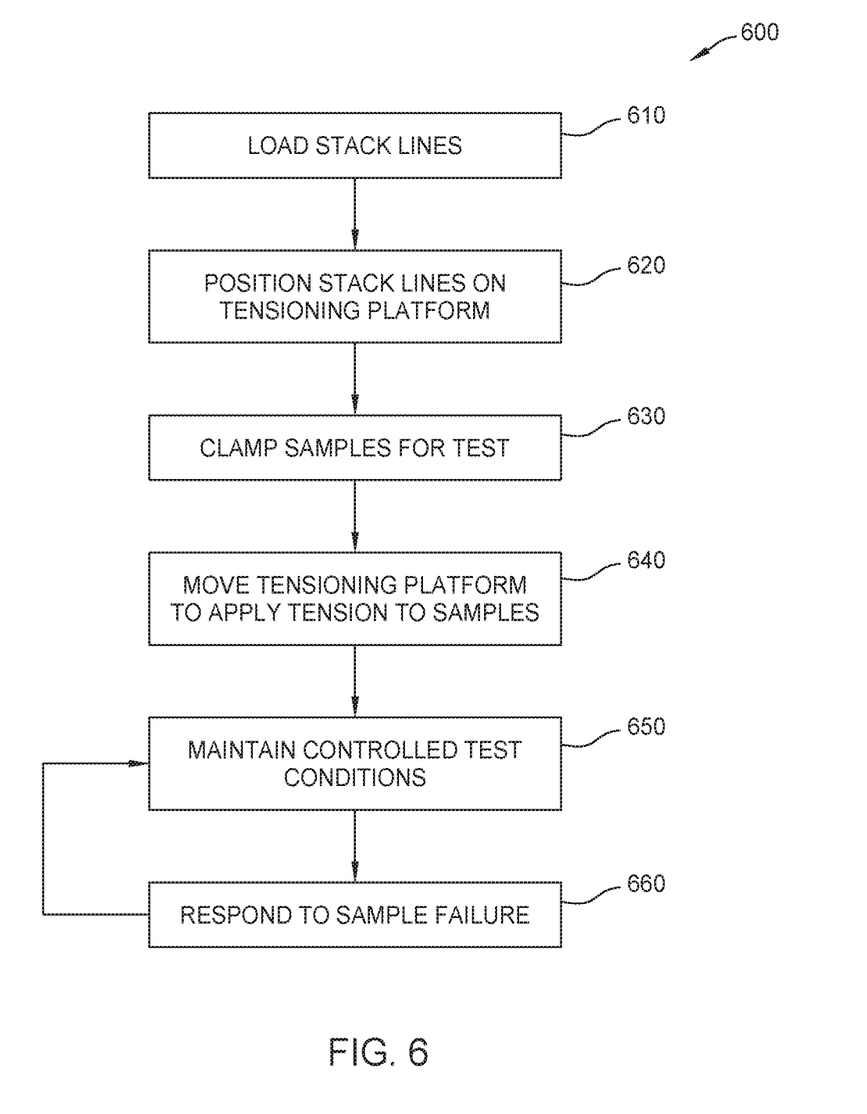
FIG. 6 is a flowchart of a method for loading and testing samples into a test stand, according to aspects of the present disclosure.

FIG. 6 is a flowchart of a method 600 for loading and testing samples 190 into a test stand 100, according to aspects of the present disclosure. Method 600 begins with block 610, where an operator loads a predefined amount of weight (e.g., as one or more weight blocks 520) onto the stack lines 145 (e.g., onto at least a first and a second stack line 145a, b).

At block 620, the operator positions the stack lines 145 on the tensioning platform 160 such that the lower clamp 140 of each stack line 145 is in alignment with a corresponding upper clamp 130.

At block 630, while the tensioning platform 160 is positioned a first distance away from the upper clamps 130 (such that the distance between the pairs of upper clamps 130 and lower clamps 140 is less than or equal to the length of the samples 190), the operator clamps or otherwise secures the samples 190 into the corresponding upper clamps 130 and lower clamps 140. In various aspects, the operator loads the stack lines 145 onto the tensioning platform 160 (per block 620) while the tensioning platform 160 is in a second position closer to the ground (or further from the upper clamps 130) than the first position in which the samples 190 are first secured to the upper clamps 130 and lower clamps 140. In such aspects, the operator raises the tensioning platform between performing block 620 and block 630.

At block 640, the operator moves the tensioning platform 160 to a second distance away from the upper clamps 130 that is greater than first distance in which the samples 190 are secured in the upper clamps 130 and lower clamps 140 (per block 630). Accordingly, the stack lines 145 are suspended above the tensioning platform 160 to apply respective tensions to the samples 190 based on the amount of weight loaded onto the stack lines 145 (per block 610).

At block 650, the operator maintains a predefined atmosphere and temperature so that the samples 190 are held in test under controlled conditions for at least a predefined amount or time or until the samples 190 fail. The operator may adjust the temperature, humidity, pressure, atmospheric composition, etc., during test according to the controlled test conditions.

At block 660, in response to a sample 190 failing, and the stack line 145 falling back to the tensioning platform 160, the test stand 100 dissipates the force of impact of the fallen stack line 145 on any still-suspended stack line 145 by cushioning and spreading the impact (e.g., via a pad 210 disposed on the tensioning platform 160, one or more bumpers 220 under the tensioning platform 160, separators 230 between the stack lines 145, etc.).

Additionally, the fallen stack line 145 may generate an alert in response to the associated sample 190 breaking. For example, a weight or contact sensor in the tensioning platform 160 under the fallen stack line 145 can trigger in response to the stack line 145 falling thereon. In another example, a weight sensor in the upper clamp 130 (or between the upper clamp 130 and the rail 120) can trigger in response to the weight of the stack line 145 being removed therefrom (e.g., by the stack line 145 resting weight on the tensioning platform 160). The alert may trigger an indicator on the test chamber or the test stand 100 (e.g., turning on or off a light or siren), transmit a message to an operator (e.g., in a control software system, as an email, as a text message), stop a stopwatch associated with the failed sample 190 indicating how long the sample 190 survived testing, etc.

Regardless of whether an individual sample 190 fails, the test may continue for the other samples 190 held in a shared test stand 100 or in a shared environment (e.g., in a test chamber with multiple test stands 100), and method 600 may return to block 650 for continued maintenance of controlled test conditions until such time as all the samples 190 have failed or an operator terminates the test (e.g., after a predefined amount of time).

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A device, comprising:
   a frame;
   a first upper clamp and a second upper clamp hanging from the frame;
   a first stack line, including:
     a first lower clamp aligned with the first upper clamp; and
     a first weight platform configured to carry a first user-defined amount of weight;
   a second stack line, including:
     a second lower clamp aligned with the second upper clamp; and
     a second weight platform configured to carry a second user-defined amount of weight; and
   a single actuator configured to move a tensioning platform uniformly to move the first weight platform and the second weight platform from a first distance relative to the first upper clamp and the second upper clamp to a second distance, greater than the first distance, relative to the first upper clamp and the second upper clamp.

2. The device of claim 1, further comprising: a separator connected to the frame between at least a portion of the first weight platform and a portion of the second weight platform.

3. The device of claim 1, further comprising:
   a pad disposed between the tensioning platform and the first stack line, the pad further comprising:
     a cushioning layer configured to mitigate a force of impact from the first stack line on the tensioning platform; and
     a non-stick layer disposed between the cushioning layer and the first stack line configured to prevent the first stack line from adhering to the cushioning layer.

4. The device of claim 1, wherein the first weight platform and the second weight platform are each configurable to carry a variable amount of weight.

5. The device of claim 1, wherein the first stack line and the second stack line are of a uniform height.

6. The device of claim 1, further comprising: a chamber in which the frame is located that is configured to maintain a predefined atmosphere and maintain a predefined temperature.

7. The device of claim 1, wherein:
   the first upper clamp and the first lower clamp are configured to hold a first sample under a first tension applied via the first weight platform when the tensioning platform is positioned at the second distance; and
   the second upper clamp and the second lower clamp are configured to hold a second sample under a second tension applied via the second weight platform when the tensioning platform is positioned at the second distance.

8. The device of claim 7, wherein:
   the first upper clamp is held from a first rail of the frame at a first height relative to the tensioning platform;
   the second upper clamp is held from a second rail of the frame at a second height, less than the first height, relative to the tensioning platform;
   the first stack line is a first length; and
   the second stack line is a second length less than the first length.

9. A system, comprising:
   a first sample held at a first upper end by a first upper clamp and held at a first lower end by a first lower clamp;
   a second sample held at a second upper end by a second upper clamp and held at a second lower end by a second lower clamp;
   a first stack line connected to the first lower clamp and to a first predefined amount of weight;
   a second stack line connected to the second lower clamp and to a second predefined amount of weight;
   a tensioning platform configured to move between:
     a first position at which a first tension based on the first predefined amount of weight is applied to the first sample via the first stack line and a second tension based on the second predefined amount of weight is applied via the second stack line to the second sample; and
     a second position at which the first tension is removed from the first sample and the second tension is removed from the second sample; and
   wherein the tensioning platform further comprises a pad disposed between the tensioning platform and the first stack line, the pad having a non-stick layer configured to prevent the first stack line from adhering to the pad.

10. The system of claim 9, wherein the tensioning platform is configured to remove slack from the first sample and the second sample at a uniform rate when moved from the second position to the first position.

11. The system of claim 9, wherein the tensioning platform includes a selectively removable lever, the lever being configured to provide a mechanical advantage in moving the tensioning platform between the first position and the second position.

12. The system of claim 9, wherein the first upper clamp, the second upper clamp, and the tensioning platform are mounted in a frame.

13. The system of claim 9, further comprising: a separator disposed between the first stack line and the second stack line.

14. The system of claim 9, wherein the first predefined amount of weight is different from the second predefined amount of weight.

15. The system of claim 9, further comprising: a chamber containing a controlled atmosphere at a controlled temperature in which the first sample and the second sample are located.

16. A method, comprising:
   loading a first predefined amount of weight on a first stack line;
   loading a second predefined amount of weight on a second stack line;
   positioning the first stack line and the second stack line on a tensioning platform in alignment with a first upper clamp and a second upper clamp respectively when the tensioning platform is a first distance away from the first upper clamp and the second upper clamp;

clamping a first sample to a first lower clamp of the first stack line and the first upper clamp;

clamping a second sample to a second lower clamp of the second stack line and the second upper clamp; and moving the tensioning platform, through use of a single actuator, to a second distance away from the first upper clamp and the second upper clamp that is greater than the first distance such that the first stack line and the second stack line are suspended above the tensioning platform to apply a first tension to the first sample based on the first predefined amount of weight and a second tension to the second sample based on the second predefined amount of weight.

17. The method of claim 16, further comprising: in response to one of the first sample and the second sample breaking, generating an alert.

18. The method of claim 16, further comprising: in response to one of the first sample and the second sample breaking, dissipating a force of impact to a non-broken sample via a pad disposed on the tensioning platform.

19. The method of claim 16, further comprising: maintaining the first sample and the second sample at a predefined atmosphere and temperature for a predefined amount of time while the tensioning platform is located the second distance away from the first upper clamp and the second upper clamp.

20. The method of claim 16, further comprising: maintaining the first sample and the second sample in a known liquid composition for a predefined amount of time while the tensioning platform is located the second distance away from the first upper clamp and the second upper clamp.

* * * * *